United States Patent
Shah et al.

(10) Patent No.: US 12,393,508 B2
(45) Date of Patent: Aug. 19, 2025

(54) AUTOMATION TESTING WITH REMOTE DEVICE INFRASTRUCTURE

(71) Applicant: BrowserStack Limited, Dublin (IE)

(72) Inventors: Karan Shah, Mumbai (IN); Francis Fernandes, Mumbai (IN); Aliakbar Attarwala, Mumbai (IN)

(73) Assignee: BrowserStack Limited, Dublin (IE)

( * ) Notice: Subject to any disclaimer, the term of this patent is extended or adjusted under 35 U.S.C. 154(b) by 175 days.

(21) Appl. No.: 18/221,267

(22) Filed: Jul. 12, 2023

(65) Prior Publication Data

US 2025/0021471 A1 Jan. 16, 2025

(51) Int. Cl.
*G06F 11/3668* (2025.01)

(52) U.S. Cl.
CPC ........ *G06F 11/3688* (2013.01); *G06F 11/368* (2013.01)

(58) Field of Classification Search
CPC .............................. G06F 11/3688; G06F 11/368
USPC ........................................................ 717/124
See application file for complete search history.

(56) References Cited

U.S. PATENT DOCUMENTS

| | | | | |
|---|---|---|---|---|
| 7,793,155 B2* | 9/2010 | Belvin | ................. | G06F 11/3688 |
| | | | | 714/38.14 |
| 10,678,666 B1* | 6/2020 | Gauf | ...................... | G06F 11/261 |
| 11,216,358 B2* | 1/2022 | Mayhew | ............. | G06F 11/3089 |
| 2005/0240841 A1* | 10/2005 | Lin | ...................... | G06F 11/3688 |
| | | | | 714/724 |
| 2007/0162845 A1* | 7/2007 | Cave | ...................... | G06F 40/117 |
| | | | | 715/764 |
| 2015/0006966 A1* | 1/2015 | Dimitrovich | ........... | H04L 67/01 |
| | | | | 714/38.14 |
| 2015/0026665 A1* | 1/2015 | Chen | ................... | G06F 11/3688 |
| | | | | 717/124 |
| 2015/0331779 A1* | 11/2015 | Subramaniam | ..... | G06F 11/3688 |
| | | | | 717/124 |
| 2015/0331784 A1* | 11/2015 | Nanjundappa | ...... | G06F 11/3688 |
| | | | | 717/124 |
| 2021/0200664 A1* | 7/2021 | Balakrishnan | ...... | G06F 11/3688 |
| 2022/0206929 A1* | 6/2022 | Rao | ...................... | G06F 11/3698 |
| 2022/0417129 A1* | 12/2022 | Manuel | ................... | H04L 43/14 |

* cited by examiner

*Primary Examiner* — Wei Y Zhen
*Assistant Examiner* — Amir Soltanzadeh
(74) *Attorney, Agent, or Firm* — Cognition IP, P.C.; Edward Steakley; Justin White (57) ABSTRACT

A remote software development infrastructure can include cross-continent datacenters with a variety of remote devices. The infrastructure can provide automated testing on the remote devices. A software development kit (SDK) can be used to integrate a test suite with the infrastructure. The SDK can modify the test suite to issue test commands to a remote test server of the infrastructure, as opposed to local test servers. A remote test server routes the test commands to a remote device in a datacenter. Both local testing and remote testing of a test script is possible. The SDK enables cross-browser, cross-device, cross-operating system and/or parallel testing of the test suite, without the user having to make code changes to the test suite. The test results and additional information are automatically captured and are aggregated in a dashboard in the form of aggregated reports and other graphical user interface elements.

20 Claims, 7 Drawing Sheets

AUTOMATION TESTING WITH REMOTE DEVICE INFRASTRUCTURE

BACKGROUND

Field

This invention relates generally to the field of enabling a remote infrastructure for application and website development on multiple platforms, and more particularly to local and Internet networking for the remote device infrastructure.

Description of the Related Art

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The multitude of computers, mobile devices and platforms have given consumers a vast universe of computing choices. Naturally, software, application and website developers have a keen interest in ensuring their products work seamlessly across the existing platforms, including older devices on the market. This creates a challenge for the developers to properly test their products on the potential devices and platforms that their target customers might use. On the one hand, acquiring and configuring multiple potential target devices can strain the resources of a developer. On the other hand, the developer cannot risk disregarding a potential target device in their typical development cycle. Even for prominent platforms, such as iOS® and Android®, at any given time, there are multiple generations and iterations of these devices on the market, further complicating the development and testing process across multiple platforms. This dynamic illustrates a need for a robust infrastructure that enables developers to test their products across multiple devices and platforms, without having to purchase them. Described systems and techniques enable software developers to test their software across multiple platforms, without having to invest resources in purchasing the hardware and software needed to perform multi-platform development.

SUMMARY

The appended claims may serve as a summary of this application.

BRIEF DESCRIPTION OF THE DRAWINGS

These drawings and the associated description herein are provided to illustrate specific embodiments of the invention and are not intended to be limiting.

DETAILED DESCRIPTION

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

Software developers, particularly website, web application and mobile device application developers have can benefit from ability to test and develop their applications on a multitude of hardware and software platforms that their target audience may use. A variety of device manufacturers provide the hardware consumers and businesses use. Examples include, mobile devices manufactured by Apple® Inc., Google® LLC, Samsung Electronics Co. Ltd., Huawei® Technologies Co. Ltd., and others. Similarly, a variety of operating systems for consumer electronic devices exist. Examples include Apple iOS®, Android® operating system (OS), and Windows® Mobile, Windows® Phone and others. Each operating system in common usage today has gone through several updates and improvements. Consequently, target audience of an app scattered across the globe can potentially be using an older version of an operating system for a platform. Furthermore, app users have a variety of choices as far as the web browser application they can use. Examples include Safari®, Chrome®, FireFox®, Windows Explorer®, and others. The variety of choices and combinations of operating systems, devices and browsers present a difficult challenge for a web/app developer to test products on potential target devices. Traditionally, a developer might have to acquire a test device and spend resources configuring it (for example, by installing a target OS, a browser, etc.) as well as providing a secondary hardware device to connect the test device to a local machine of the developer, in order to write code and conduct tests on the test device. This approach is furthermore challenging as procuring older versions of devices and operating systems can be difficult or impossible, as manufacturers in many cases do not provide a downgrade option. The sheer variety of possible devices, operating systems, browsers, and combinations of them are numerous and can present a logistical hurdle to the developer.

A testing provider can enable a remote development system (RDS), having a multitude of devices for a developer to connect to and conduct tests on an application. The developer can connect to the RDS, select a test device, select a configuration (e.g., a particular OS, a browser, etc.) load the developer's application into the selected device and run tests on the application running on the selected remote device. The RDS can include one or more servers powering a website or a desktop application, which the developer can use to connect with and interact with the RDS.

The RDS can be used for running both manual and automated tests. For manual tests, the RDS can generate a replica or mirrored display of a remote device in a datacenter onto a local computer of the user of the RDS. The RDS can capture user interactions on the replica display and inject those interactions into the remote device. The user can observe the result of the interactions on the replica display. For automated testing, the user can integrate an existing test automation suite with the RDS to run test scripts on a remote device in a datacenter.

Figure 1:
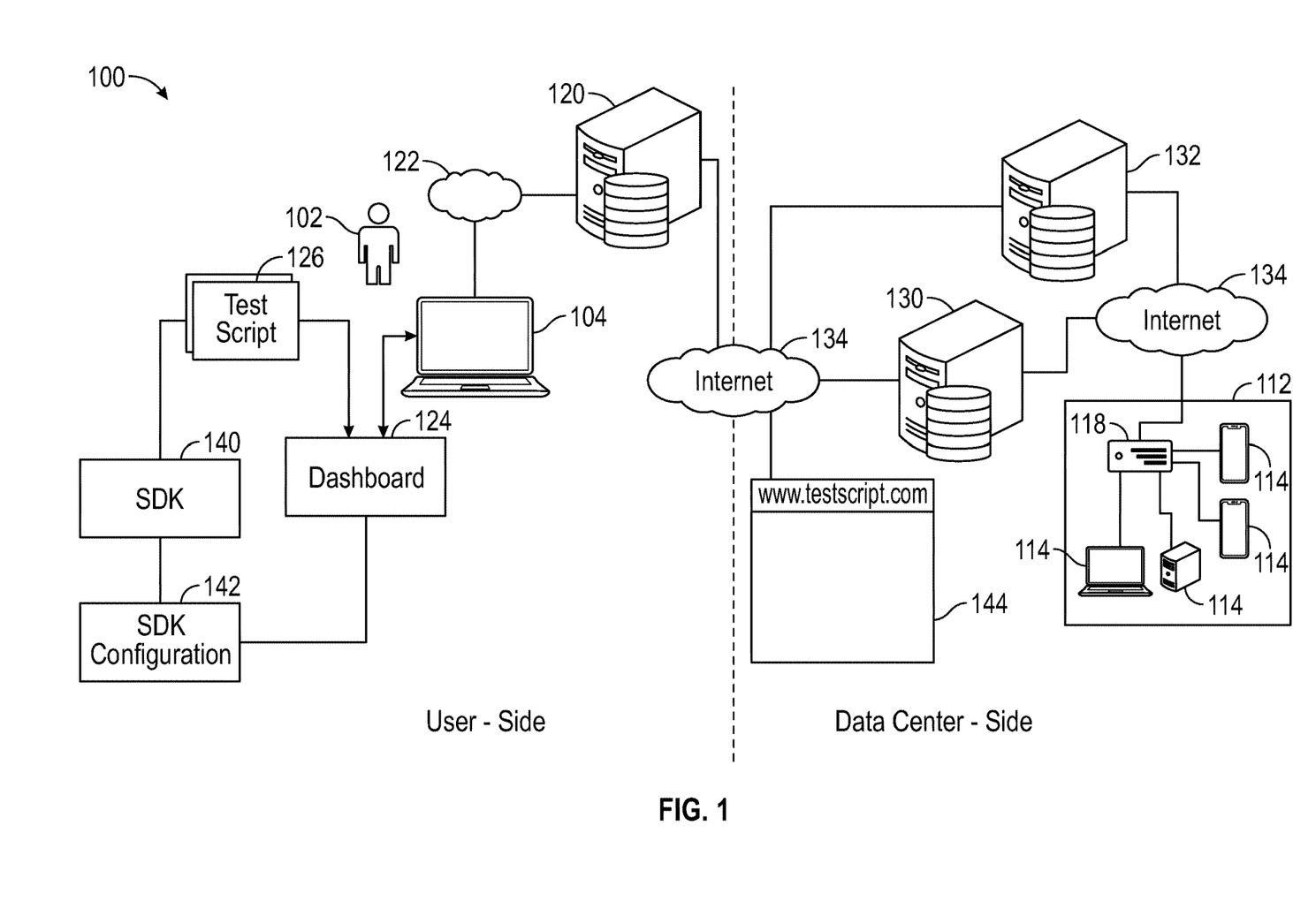
FIG. 1 illustrates a diagram of an implementation of remote development system for automated testing.

FIG. 1 illustrates a diagram 100 of an implementation of the RDS for automated testing. The user 102 can be in communication with the RDS infrastructure via a local computer 104 and through the Internet 134. The user 102 can have a test script 126, which the user may wish to execute on various platforms, operating systems and devices. The local computer 104 can also be connected to one or more private servers 120 through a user's private network 122. The test script 126 can be a suite of tests, spanning a vast number of applications and can include subtests and/or various tiers of tests, scheduled to run periodically and/or at various selected events, such as prior and/or after a major software release. Furthermore, the test script 126 can relate to testing and software development for a software 144. The software 144 can include a variety of types. In some examples, the software 144 can be a publicly accessible website, for which the user 102 writes test script 126. In other examples, the software 144 is not publicly accessible and may reside in the user's private network 122 and/or on a user's private server 120. In other examples, the software 144 can be a desktop and/or mobile application.

In some examples, the user 102 may desire to automatically run the test script 126 on a variety of platforms, browsers, and/or operating systems. For example, the software 144 can be an e-commerce website and the test script 126 can include code to test the correct operations of the software 144. Example tests that the user 102 may implement in the test script 104, in the case of an e-commerce website, can include testing proper loading of various pages of the website, testing the search functionality, testing ability to add items to an online shopping cart, testing ability to check-out one or more items placed in a shopping cart, testing the website's ability to generate proper messages for a backend system to fulfill an online purchase, and many more potential tests. The test script 126 can vary depending on the domain and context of the software 144.

In some embodiments, the RDS operator can provide the user 102 with a dashboard 124 for interfacing with and integrating the test script 126 with the RDS infrastructure. The dashboard 124 can be accessible via a URL or can be a desktop application and/or both. The dashboard 124 can be a graphical user interface (GUI) for the user 102 to interact with the RDS, and view test results. Furthermore, the operator of the RDS can provide a software development kit (SDK) 140 to the user 102 to facilitate integrating the test script 126 with the RDS infrastructure to enable the test script 126 to run automated tests on remote devices, without the user having to make code changes to the test script 126. In some embodiments, the SDK 140 can be added as a dependency to a framework in which the user runs the test script 126. Furthermore, the user 102 can use an SDK configurator 142 to modify and/or generate the test script 126, with various parameters, to enable its integration with the RDS and to inform the RDS as to the desired test parameters. In some embodiments, a corresponding YAML or YML file can also be generated that defines the parameters of the test script, such as various browsers on which the user wishes to run the test script 126. YAML or YML file is a human-readable language for defining configuration files. In some applications, the user 102 already has extensive test scripts 126, prior to becoming a user of the RDS, which the user may wish to port to or to integrate with the RDS. Various embodiments described herein can facilitate the integration of existing test scripts 126 with the RDS, such that the burden of integration coding for the user 102 is reduced or minimized, while the user is provided with additional features to further increase the usefulness of integration and testing with the RDS.

The RDS infrastructure can operate in two aspects. One aspect includes the user-side domain, and another aspect includes the datacenter-side. However, various components of the infrastructure can be distributed and this division does not necessarily mean only two physical locations of the operations of the RDS. The RDS can include one or more datacenters 112, distributed globally and accessible via the Internet 134. The datacenters 112 can include various combinations of devices and platforms. The combinations can be extensive and can encompass many potential platforms, which a customer of the software 144 may use to access and/or execute the software 144. Therefore, the datacenters 112 can include a variety of remote devices 114, running various platforms, operating systems and browsers. The remote devices 114 can include mobile devices, desktops, laptops, tablets, smart TVs, smart wearables, and any device, which a customer of the software 144 may be likely to use to access and/or to execute the software 144. The remote devices 114 may be connected to the Internet 134 via one or more host machines 118 in a datacenter 112.

One or more remote device infrastructure (RDI) servers 132 can handle the assignment of remote devices 114 to the users of the RDS, or to test scripts 126 from various users 102. The RDI servers 132 can perform a variety of functions, including maintaining a database of the remote devices 114, and their availability statuses. In automation testing, a remote driver server 130 can be used to facilitate automation testing on the remote devices 114.

In local testing, the test script 126 can be configured to run tests locally on the local computer 104. In some cases, the users 102 design and write the test script 126 for local testing prior to becoming a user of the RDS and may wish to adapt their test script 126 to use the RDS and the remote devices 114, instead of or in addition to running the test script 126 locally. Running tests remotely on the remote devices 114 can be referred to as remote testing. In some cases, the users may wish to be able to switch between local and remote testing, with reduced or minimal modification to the test script 126.

Figure 2:
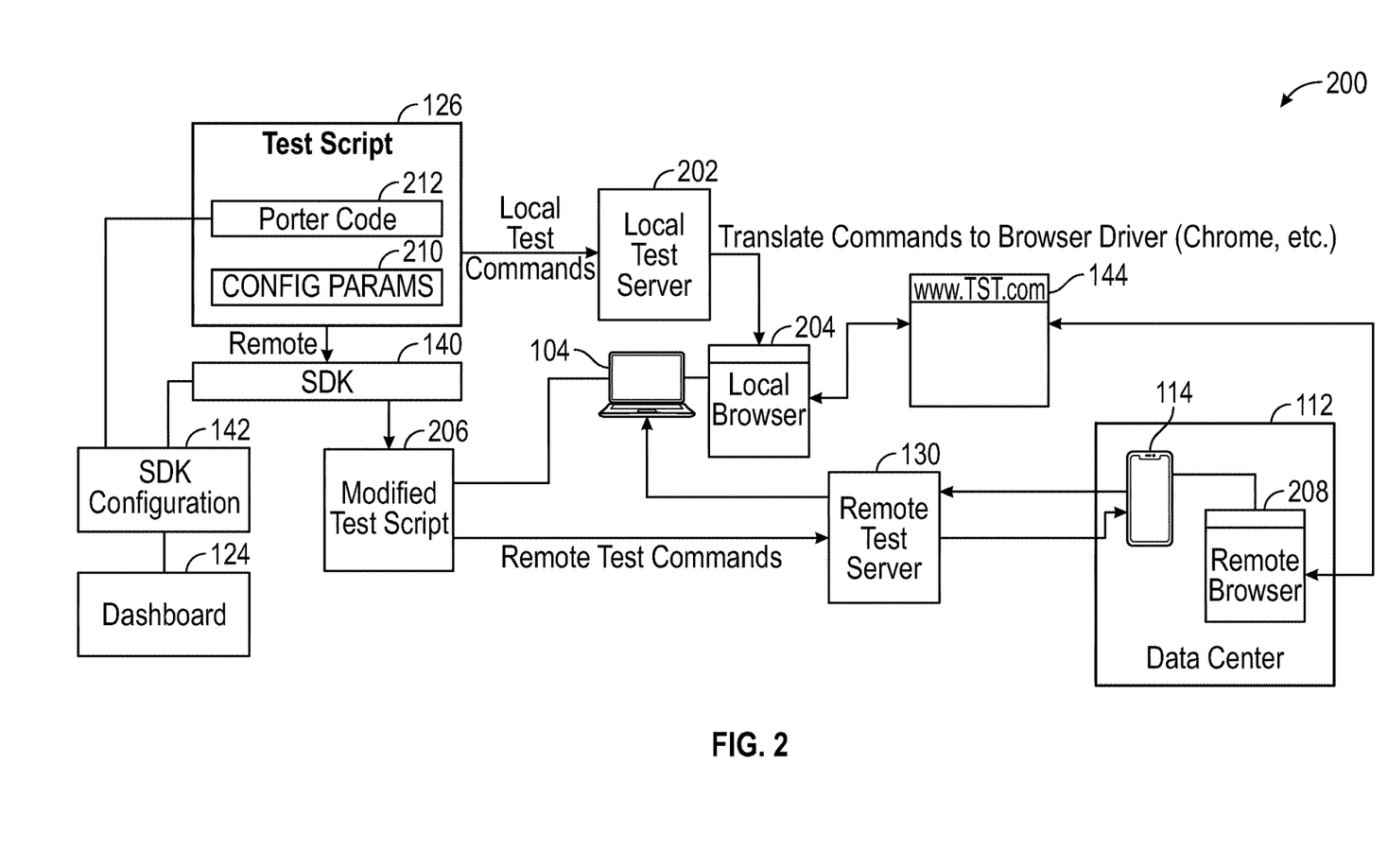
FIG. 2 illustrates a diagram of an environment of local and remote testing.

FIG. 2 illustrates a diagram 200 of an environment of local and remote testing. In some embodiments, the test script 126 can issue test commands to the software 144 causing the software 144 to generate a response to the test commands. In some embodiments, the test commands may be HTTP commands or other web traffic to the software 144. For local testing, the test script 126 can include local test commands, which can cause the local computer 104 to generate a local test server 202. The local server 202 can in turn translate and/or otherwise issue the test commands to the software 144 in a compatible format. For example, in embodiments where the software 144 is a website or web application, the local test server 202, may be a web driver, which can spawn a copy of a local browser 204 and communicate the local test commands and/or the translated local test commands to the local browser 204. The type and version of the local browser 204 may be specified in the configuration parameters 210 in the test script 126. The local test server 202 continues to execute the test script 126 via the local browser 204 to test the software 144. In local testing, the local test server 202, and the local browser 204 run locally on the local computer 104. The user has a chance to receive responses of the software 144 to the test script 126, corresponding to accessing and/or running the software 144 from the local computer 104. The user can examine the responses of the software 144 to the test script 126, corresponding to accessing and/or running the software 144 from a remote device 114 by utilizing the remote testing functionality of the RDS. In this manner, the user can test the software 144 on a variety of devices and platforms.

For remote testing, the SDK 140, and the SDK configurator 142 can be used to generate a modified test script 206, without the user having to make code changes to the test script 126. In some embodiments, the SDK configurator 142 can be access via the dashboard 124, where the user can input some desired remote testing parameters, including for example, a selection of remote devices 114 and/or operating systems. The SDK configurator 142 can generate a porter code 212, which can be inserted into the test script 126. The porter code 212 can cause the test script 126 to integrate the SDK 140 and generate a modified test script 206 at run time. The modified test script 206 can be in part generated by parsing the test script 126 and replacing the instances of access commands to the local test server 202 with commands to access the remote test server (RTS) 130, instead. In this manner, executing the modified test script 206 issues the same or similar commands as the test script 126, but to the RTS 130. The porter code 212 can also include authentication data, so the test script 126 can run on the RDS. The modified test script 206 runs on or from the local computer 104, but it issues test commands to the RTS 130, instead of to the local test server 202. Among various functionality, in the case of the software 144 being a website or a web application, both the local test server 202 and the remote test server 130 can perform translating the test commands to browser commands. In other words, in the case of testing websites and web applications, the local test server 202 and the remote test server 130 can be said to be browser drivers and/or can include browser driver applications. The translated test commands are communicated to a corresponding browser.

The RTS 130 can communicate with the RDI 132 to obtain a remote device 114 matching the description identified in the porter code 212. The RDI 132 can assign a remote device 114 to the modified test script 206. When the software 144 is a website or web application, the RTS 130 can spawn a remote browser 208 on the remote device 114. The remote test commands from the modified test script 206 can be routed to the remote browser 208. The remote browser 208 can access or execute the software 144, based on the remote test commands. The responses of the software 144 to the remote test commands can be routed from the remote device 114 to the local computer 104. The local and the remote test commands are the same commands defined in the test script 126, where the local test commands are issued to the local test driver 202, while the remote test commands are issued to the RTS 130.

The SDK 140 could be different for various programming languages in which the test scripts 126 are written. For example, in some embodiments the test script 126 is written in Java. The RDS can provide a Java-specific SDK 140, which allows the user to integrate Java test script 126 with the RDS, without the user having to make code changes to the test script 126. In the case of Java, a remote web driver class can act as the RTS 130. The SDK 140 can intercept the remote web driver class using JavaAgent on run time, and insert a modification logic to modify the "capabilities" parameters in the test script 126 (or an object code of the test script 126) to allow the test script 126 to run remotely run on the RDS, The SDK 140 can recompile the code, and return the modified bytecode. For example, in Java, a type of class called, "Java agent" can be used, which in turn can use the Java Instrumentation API to intercept a test script 126 running on a java virtual machine (JVM) process. The SDK 140 can intercept and modify the bytecode. The modifications can in part include changing the bytecode to route to the remote test driver 130 (or a remote web driver in the case of Java code) instead of routing to the local test server 202.

Figure 3:
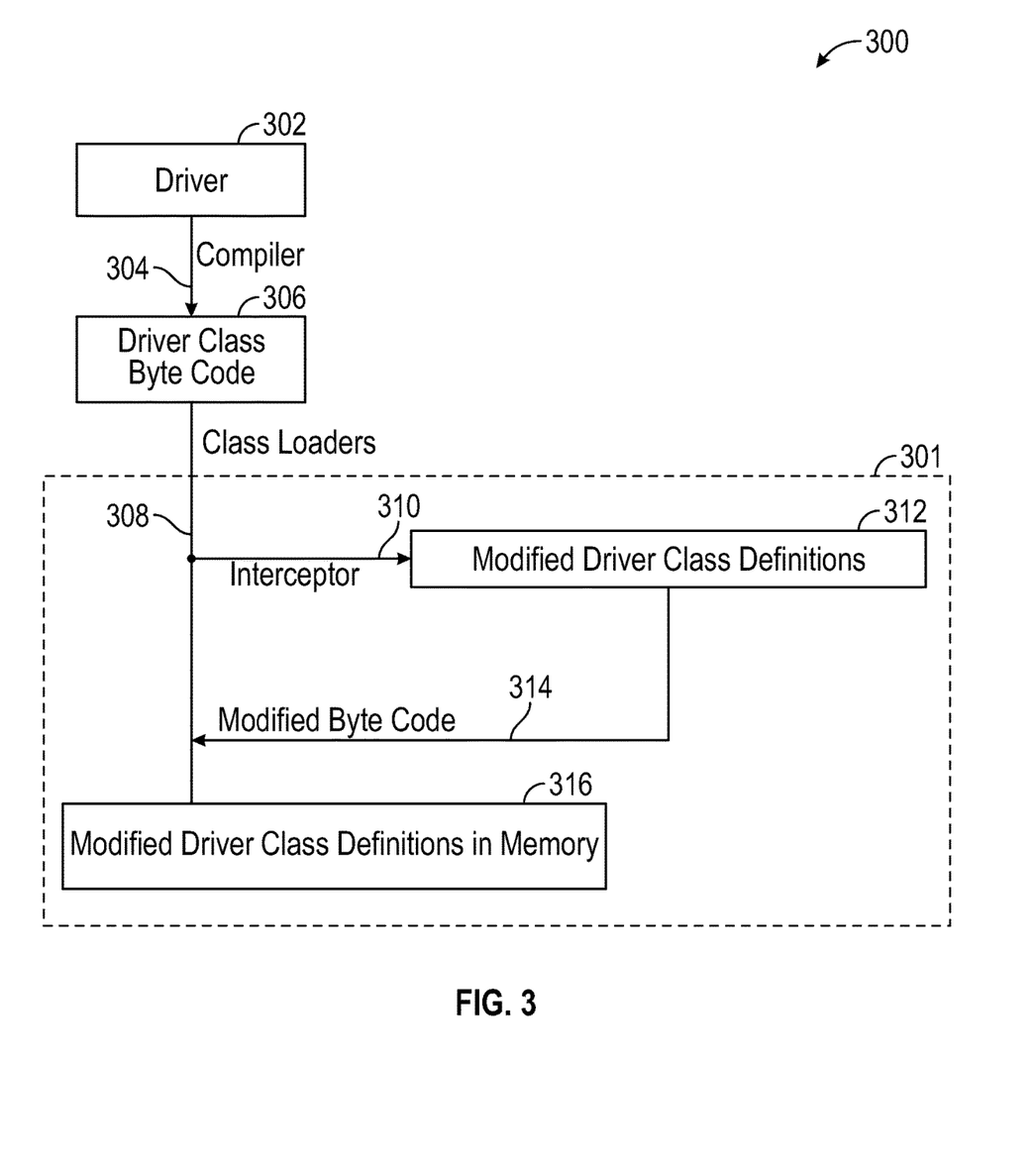
FIG. 3 illustrates a block diagram of example operations to generate a modified test script to enable remote automated testing.

FIG. 3 illustrates a block diagram 300 of example operations to generate a modified test script to enable remote testing. The modification can depend on the programming language and the framework of the test script 126. The type of programming language and/or framework can also determine when in the cycle of loading, compiling and running (execution), the modification is performed. For example, in the case of Java code, a remote web driver class is intercepted, the class is modified to replace traffic to the local test driver 202 with traffic to the remote test server 130, and a modified bytecode is returned to the JVM at run time. The SDK 140 may perform the modification differently, depending on the programming languages and the frameworks used by the test script 126. Nonetheless, the modifications cause the test script 126 to be modified in a way to send test commands to the remote test server 130 and ultimately to a process on the remote device 114, as opposed to sending local test commands to the local computer 104 and a process running thereon.

Referring to FIG. 3, a driver 302 is generated. In the case of Java, the driver 302 can be a web driver. A compiler process 304 can generate driver class bytecode 306. Class loaders 308 load the driver class bytecode 306 into a process 301. In some embodiments, the process 301 includes the SDK 140. To enable remote testing, an SDK interceptor 310 can intercept the class loaders 308 and the driver class bytecode. The SDK interceptor 310 modifies the driver class bytecode by decompiling it and changing the test commands sending traffic to a local driver, such as the local test driver 202, to test commands sending traffic to a remote driver, such as the RTS 130. In the case of Java code, the SDK interceptor 310 can intercept the class loaders and can perform the modification via an instrumentation application programming interface (API) of a Java Agent process. The SDK interceptor 310 returns the modified driver class definitions 312 in the form of a modified bytecode 314 back to the class loaders 308, which can upload them to memory. The modified bytecodes 314 includes modified driver class definitions 316, which inform the process 301. The process 301 executing based on the modified driver class definitions 316 issues remote test commands to the remote test server 130.

Figure 4:
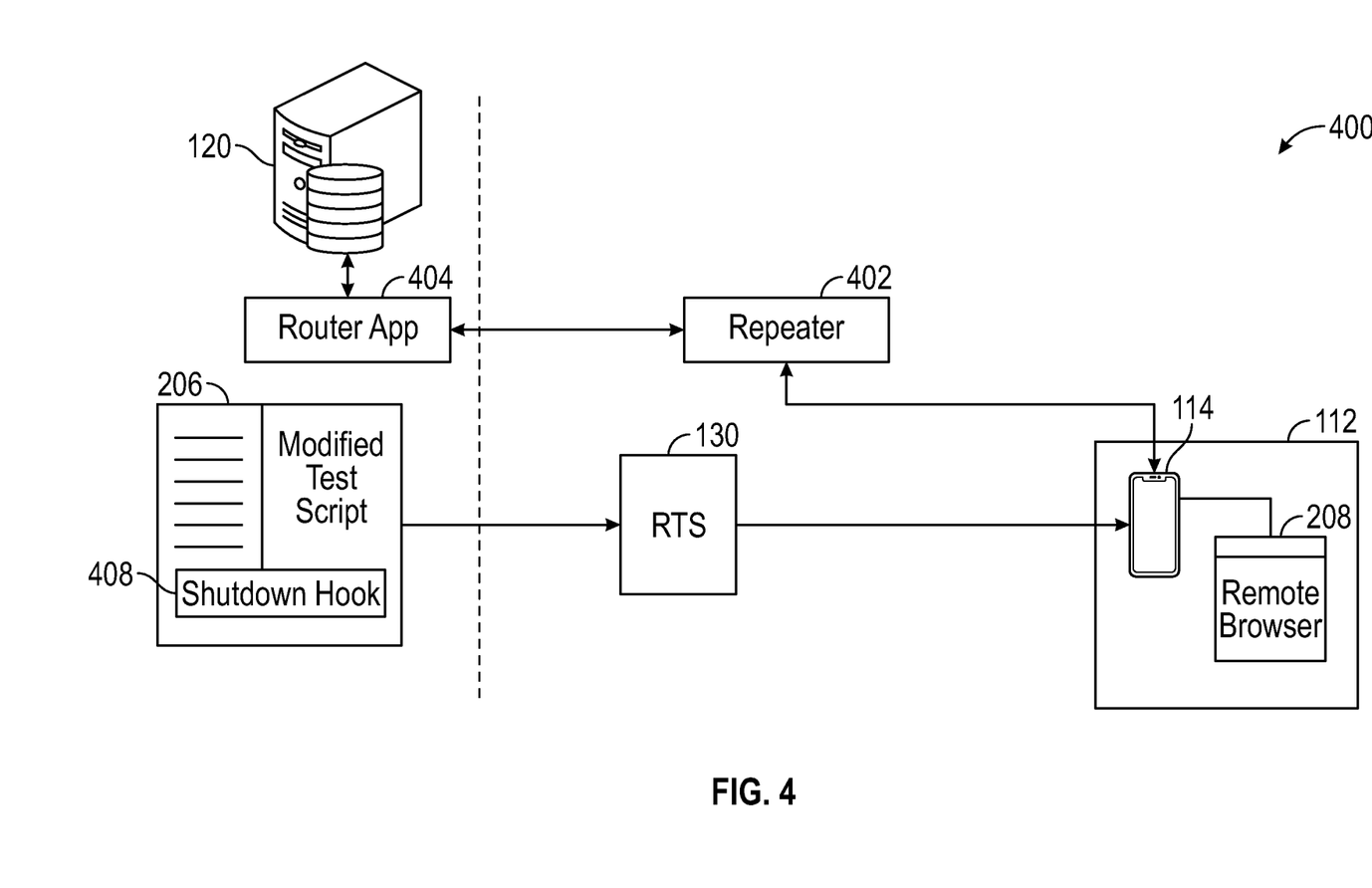
FIG. 4 illustrates a block diagram of an embodiment, where remote automated testing can include accessing a private server from a browser running on a remote device.

FIG. 4 illustrates a block diagram 400 of an embodiment, where remote testing can include accessing a private server from a browser running on a remote device. In some embodiments, the test script 126 can include test commands configured to access a private server 120. The private server 120 is usually behind firewalls and cannot be directly accessed from the Internet. In these instances, the test commands communicated to the remote browser 208 can access the private server 120 through a repeater 402 and a router app 404. The repeater 402 and the router app 404 can provide a tunneling connection between the remote browser 208 and the private server 120. In these instances, the modified test script 206, includes shutdown hooks 408 to manage the lifecycle of the router app 404. The router app 404 can be an instance of a "local binary" that allows a connection to the private server 120. In some embodiments, the SDK 140 can spawn an instance of the router app 404 for each run or build of one or more modified test scripts 206. The router app 404 is shutdown at the end of the test process. Part of the modification of the test script in remote testing on a private server can include appending a shutdown hook 408 to the test script. The shut-down hook checks the state of the router app 404, relative to the execution of the test script. When the execution of the test script is completed or when it is abruptly interrupted, the shutdown hook 408 terminates the router app 404.

Figure 5:
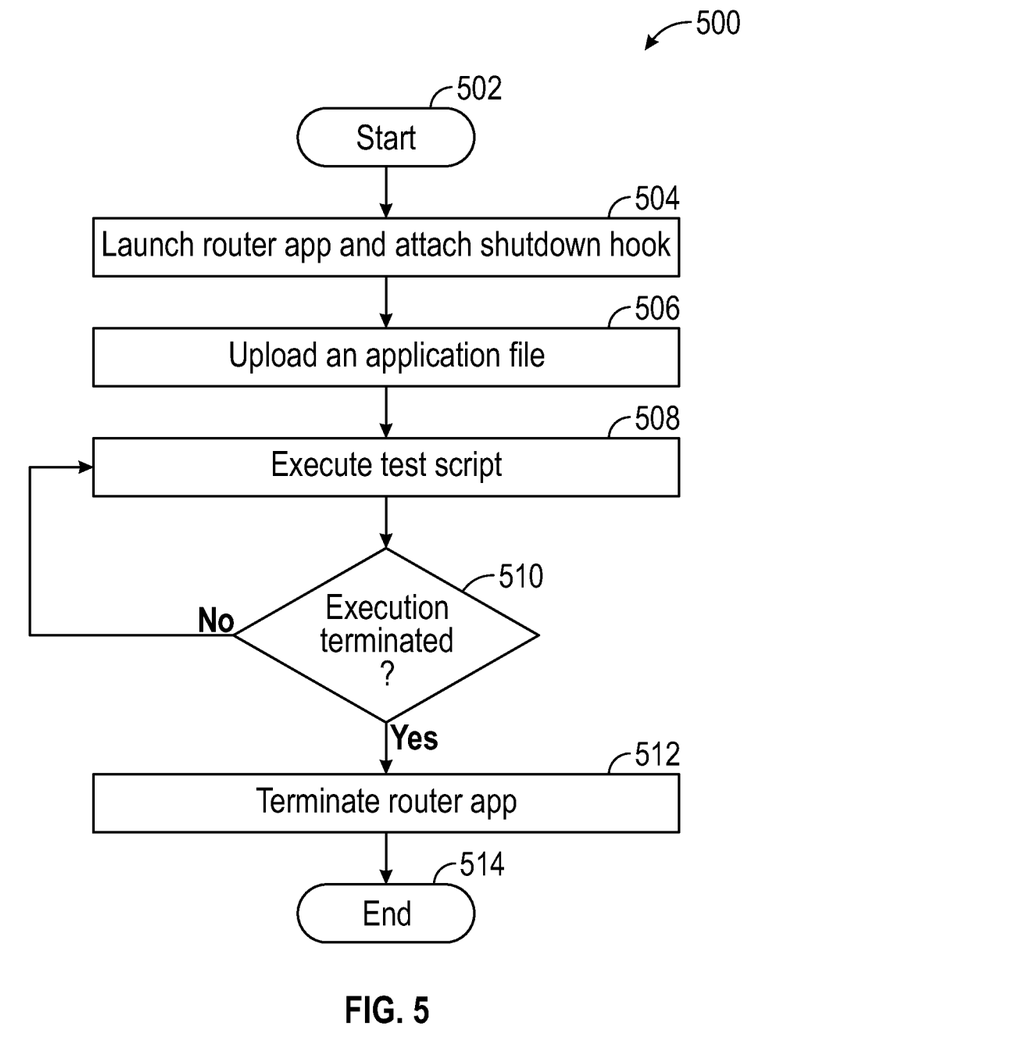
FIG. 5 illustrates a method of automated remote testing on a private server.

FIG. 5 illustrates a method 500 of remote testing on a private server. The method starts at step 502. At step 504, a router app is launched and a corresponding shutdown hook is attached. The router app is in part responsible for providing a connection from a remote device 114 from a datacenter to the private server 120. The shutdown hook monitors the execution of the test script and when it determines that the execution of the test script is terminated (by reaching the end or abruptly), the shutdown hook terminates the router app as well. At step 506, an application file may be uploaded, as part of running a test script. At step 508, the test script is executed. At step 510, the shutdown hook 408 determines whether the execution of the test script is concluded or otherwise terminated. If no, the method moves to step 508, where the execution of the test script continues. If yes, the method moves to step 512, where the shutdown hook 408 terminates the router app 404. The method ends at step 514.

The user of the RDS writes the test script 126 in a programming language and a testing framework. Programming languages such as Java, Python, Objective C, and many other examples can be used. The test script 126 can be directed to a testing framework, such as Selenium, Cypress, Playwright, and others. In the case of websites and web applications, the test script 126 can be executed by the testing framework for a browser specified in the test script 126. At the runner stage or execution stage, however, users of the RDS in many cases may wish to run the test script 126 across many browsers, without having to rewrite the test script 126. The RDS and the SDK 140 can include a multi-process or multi-browser testing feature that automatically executes the test script 126 across a plurality of processes or browsers specified by the user. The SDK 140 can assist a user to utilize multi-process testing, with reduced or minimized coding burden imposed on the user. The SDK 140 can duplicate the test script 126 across different processes and/or threads (e.g., different browsers) with reduced or minimized coding on the part of the user.

In some embodiments, the SDK 140 provides multi-process testing by deploying framework hooks. For example, for TestNG, the SDK 140 can use listeners (e.g., via service loader mechanisms), load a configuration file (e.g., a YML-format configuration file) and modify it with adding additional processes and returning the modified config file in the runtime environment. The SDK 140 can loop through the test scripts 126 and/or a test suite of test scripts 126 and generate copies of the test scripts directed to different processes. Each copy can be invoked for a corresponding process/platform in the copies corresponding modified configuration file.

In some embodiments, The SDK 140 can use system hooks. For example, for frameworks such as Junit4, Junit5, Serenity, etc., the SDK 140 can parse the internals of the process and spawn multiple processes for various combinations received from the configuration parameter file 210. After receiving a current process command Line, the SDK 140 can retrigger the tests by setting a platform property indicating, on which platform the tests can run. The resulting threads are forked, and the new processes are spawned inside the child threads. The SDK 140 waits for the spawned threads to join. In this manner, the SDK 140 can achieve parallel and multi-process execution of a test. The SDK 140 can capture the output of each of the processes and provide a consolidated result in the dashboard 124. SDK 140 can spawn and run multiple processes (e.g., browsers) for the same test script 126, and in some cases the SDK 140 can run these processes in parallel to provide simultaneous testing. In these instances, multi-process testing can also be referred to as cross-browser parallel testing.

In some instances, multi-process testing can result in test results being written in the same report file causing mixing of data from multiple processes. The SDK 140 can modify reporter classes (e.g., o/cucumber/core/options/PluginOption) to write the test results corresponding to each process to different report files. After execution of the tests and/or test suites, the SDK 140 can merge the reports corresponding to the same processes in the same report. In some embodiments, the SDK 140 can call a mergeReporterFile function, loop through the files inside an execution map and merge the reports in their respective formats.

In some embodiments, the SDK 140 can intercept test lifecycle hooks for passing context. The SDK can use framework-specific hooks where possible to achieve this. When frameworks do not expose hooks the SDK can use low-level hooks, such as org/junit/internal/runners/statements/InvokeMethod,addFailure to capture test results and mark and annotate test results.

The SDK can work across different versions of the test script languages, and frameworks. Some issues can arise while performing bytecode manipulation and modifying of the code at the class level. With changing versions of dependencies, such as changing dependencies in Selenium, the framework runners, such as TestNg, Junit, etc., the class definition, variable names, and constructor definitions may need to change too. To resolve some issues arising in these instances, the SDK 140 can extract the version of a user's dependency from their classpath and add version-specific handling to the modification of test script. For example, class definitions, variable names and constructor definitions can be modified according to the version extracted from the user-defined dependency. In other words, the SDK 140 can add version-specific handling/modification inside the SDK 140 to inject appropriate version-specific code compatible with the user-defined versions.

In some embodiments of remote testing, the SDK 140 can remove extraneous software calls to make the modified test script 206 more efficient. For example, ChromeDriver, FireFox driver can start a default ChromeDriverService, GeckoDriverService, etc. respectively to communicate with the local browser 204. ChromeDriver can create a default ChromeDriverService, which finds the executable binary in the local system (e.g., the local computer 104) and spawns the local browser 204. Since this is not needed for remote execution on the RTS 130, the SDK 140 can modify these calls to not trigger anything. To run a test session on RTS 130, the SDK 140 can generate a dummy executive file extension and initiate the ChromeDriverService, which initializes the properties internally used by other functions avoiding NullPointer/MethodNotFound exceptions. Similar techniques can be applied to other browsers to remove unnecessary calls for remote testing.

In some embodiments, the SDK 140 can pre-prepare a list of activities before a build run. For example, before a test execution begins, depending on the configuration (e.g., the configuration received in configuration parameters 210), the SDK 140 may perform activities, such as launching a router application 404 (e.g., a local binary), uploading an application file, honoring proxy variables and/or other pre-build activities. As described earlier, the SDK 140 can attach shutdown hooks to the modified test script 206 at compile time, runtime, or at other times which can be triggered at the end of a test process, including for example, in the event of an abrupt exit. Furthermore, the shutdown hooks can monitor the state of the router app 404, relative to the test execution, and can shut down the router app 404 if it is still running, while the test is concluded or abruptly terminated.

Figure 6:
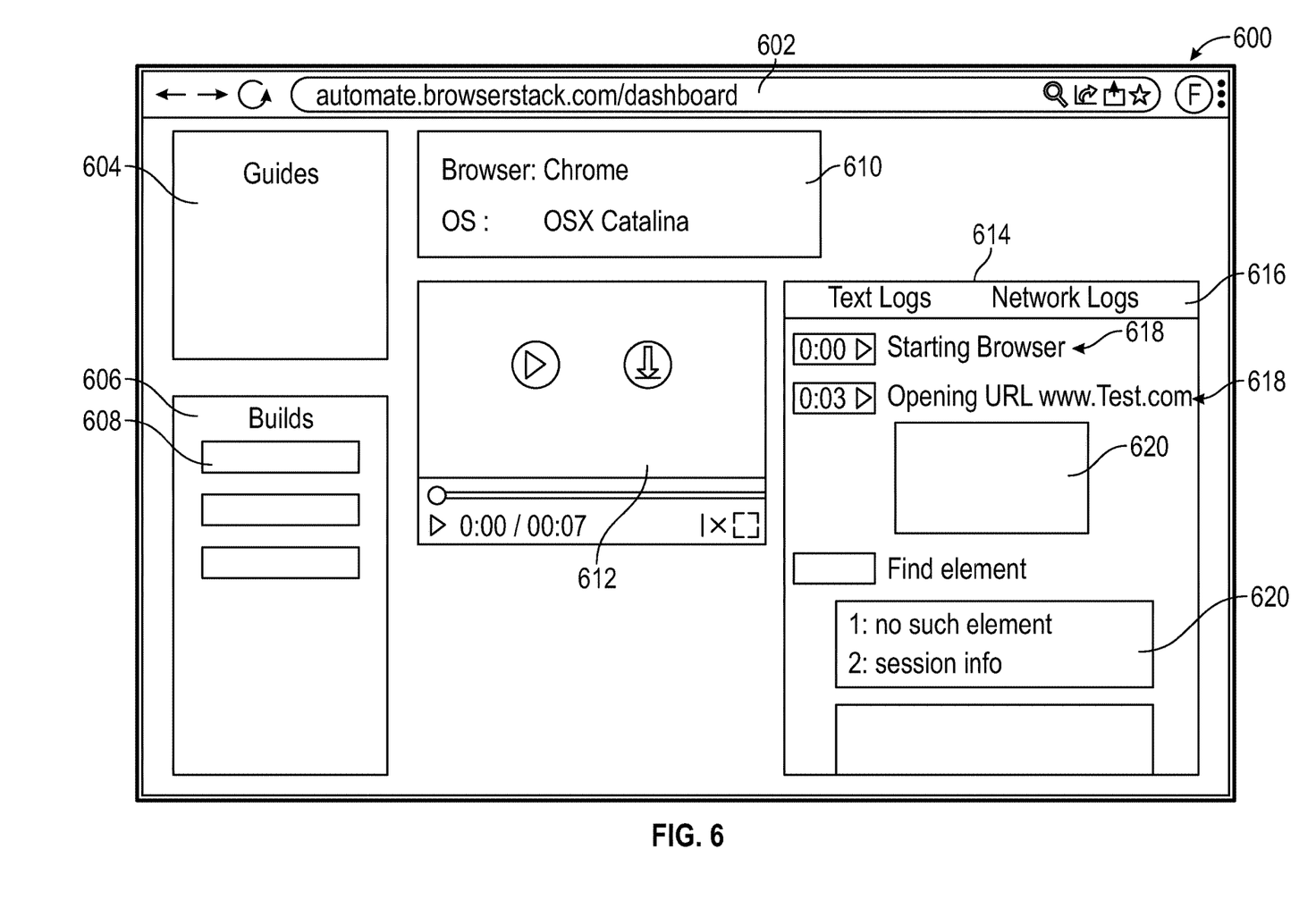
FIG. 6 illustrates a diagram of an example dashboard which can be used in combination with the described embodiments.

FIG. 6 illustrates a diagram 600 of an example dashboard 124. The dashboard 124 can be accessible via a desktop application and/or via a web application by typing a URL of the dashboard in the address bar 602 of a browser. The user 102 can access the dashboard on the user's local computer 104. The dashboard 124 can include guides 604, which can include links, texts, graphics, etc. to help the user integrate a test suite in the RDS for local or remote testing. The dashboard 124 can include a panel of builds 606. The builds 608 are a collection of test scripts 126. Builds 608 can be different for different users 102. For example, ecommerce users may have a build, which can include 4 or 5 test scripts 126. The test scripts in a build can include tests for loading an ecommerce website, searching for an item, adding the item to a shopping cart, editing a shopping cart, checking out items in a shopping cart, and other tests related to the proper functioning of an ecommerce site. Users in other domains may have entirely different test scripts. For automated testing, the builds 608 can be run on a selected schedule or can be triggered manually. For example, for routing monitoring of a website, the user 102 may schedule one or more builds 608 to run daily, nightly, weekly, or on another interval. The user 102 can also trigger running one or more builds 608, before and/or after a software release, version upgrade or similar events. In either case, the test scripts inside a build are run automatically on the RDS. The user can click on a build 608 to populate other information fields in the dashboard 124. For example, a platform panel can indicate the browser, operating system and/or a device on which the build was run. A video panel 612 can include a video of the screen of a remote device running the build along with a timestamped play-bar at the bottom of the video panel. In the case of local testing, the video panel 612 displays a video of the output of the software 144 on the local computer 104. In case of a remote test, the video panel 612 includes a video display of the output of the software 144 on the screen of the remote device 112.

An annotation panel 614 can provide additional information about a build run, including text logs, network logs and/or reporting placing the results of the tests in a format that can be conveniently navigated. For example, tabs 616 can allow a user to quickly access various information about a build run. In some embodiments, the annotation panel 614 can include timestamped annotations that are matched to both test commands 618 and the video panel 612. The test results 620 can also be displayed in the annotation panel 614. In this manner, the user can quickly view the result of any single line of test command 618, a video result of the display output of the response of the software 144, along with any text or screenshots related to the test command 618.

In some embodiments, the test results are not present on the RDS servers, instead, the test results are in the user's local computer 104. It can be beneficial for the user of the RDS to see an aggregation of various test results and builds, in a single dashboard, such as the dashboard 124. The RDS can capture the results of the tests that may be locally present on the user's local computer 104 and transmit them to a server of the RDS (e.g., the RDI 132). The test results can be aggregated and rendered on the dashboard 124, for example in the annotation panel 614.

In some embodiments, the SDK 140 can speed up the tests. For example, the SDK 140 can generate one or more configuration files containing optimizations that can make a test script 126 run more efficient. Each configuration file can relate to or correspond with a framework that is to run the test script 126. The configuration file can be passed to the corresponding framework of a test script 126. The runners of the framework interpret the configuration file and can run the test script 126 more efficiently.

Example Implementation Mechanism—Hardware Overview

Some embodiments are implemented by a computer system or a network of computer systems. A computer system may include a processor, a memory, and a non-transitory computer-readable medium. The memory and non-transitory medium may store instructions for performing methods, steps and techniques described herein.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be server computers, cloud computing computers, desktop computer systems, portable computer systems, handheld devices, networking devices or any other device that incorporates hard-wired and/or program logic to implement the techniques.

Figure 7:
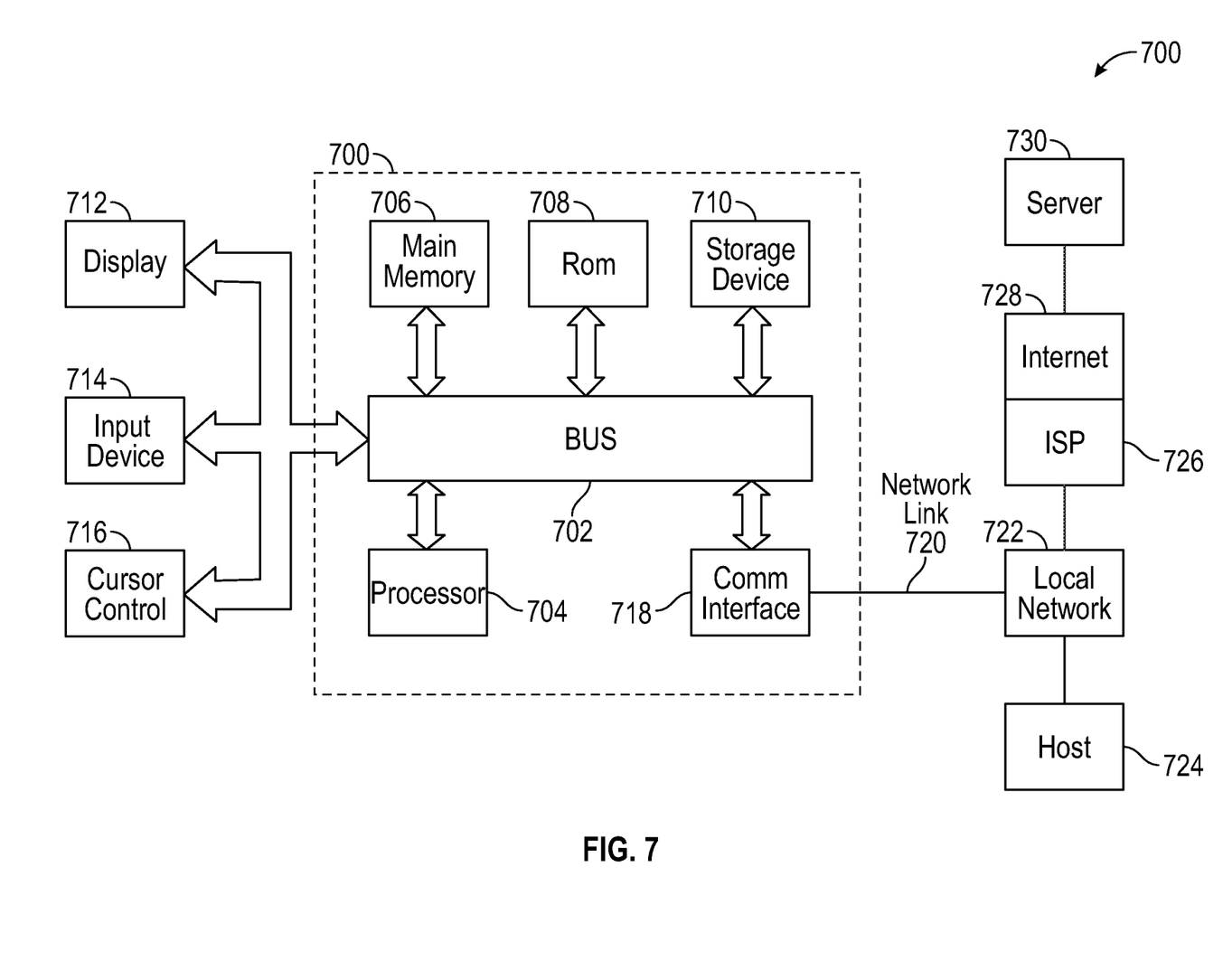
FIG. 7 illustrates an environment in which some embodiments may operate.

For example, FIG. 7 is a block diagram that illustrates a computer system 700 upon which an embodiment of can be implemented. Computer system 700 includes a bus 702 or other communication mechanism for communicating information, and a hardware processor 704 coupled with bus 702 for processing information. Hardware processor 704 may be, for example, special-purpose microprocessor optimized for handling audio and video streams generated, transmitted or received in video conferencing architectures.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid state disk is provided and coupled to bus 702 for storing information and instructions.

Computer system 700 may be coupled via bus 702 to a display 712, such as a cathode ray tube (CRT), liquid crystal display (LCD), organic light-emitting diode (OLED), or a touchscreen for displaying information to a computer user. An input device 714, including alphanumeric and other keys (e.g., in a touch screen display) is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the user input device 714 and/or the cursor control 716 can be implemented in the display 712 for example, via a touch-screen interface that serves as both output display and input device.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical, magnetic, and/or solid-state disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

EXAMPLES

It will be appreciated that the present disclosure may include any one and up to all of the following examples.

Example 1: A method of porting a testing script into a remote device testing system comprising: receiving a parameter indicating a selection of remote testing of the test script, the test script comprising testing commands; modifying the test script comprising generating remote testing commands from the test commands, the remote testing commands comprising the testing commands having a remote test server as the recipient; receiving a selection of a type of remote device and operating system, the selection indicated in a configuration file of the test script; receiving an assignment of a remote device matching the selection of the remote device and the operating system indicated in the configuration file; transmitting the remote testing commands to the assigned remote device; and executing the remote testing commands on the assigned remote device.

Example 2: The method of Example 1, wherein modifying the test script occurs at runtime.

Example 3: The method of some or all of Examples 1 and 2 further comprising: receiving a parameter indicating a selection of local testing of the test script, wherein the test commands comprise local test commands, having a local test server as recipient; skipping the steps of modifying, receiving a selection, receiving an assignment, transmitting the remote testing commands and executing; and transmitting the local test commands to the local test server.

Example 4: The method of some or all of Examples 1-3, wherein the remote device is in a datacenter housing a plurality of devices of various types and operating systems.

Example 5: The method of some or all of Examples 1-4, wherein modifying the test script occurs at compile time by: decompiling a bytecode corresponding to the test script; replacing a recipient of the test commands to be the remote test server; and recompiling the bytecode.

Example 6: The method of some or all of Examples 1-5 further comprising: generating a web driver; compiling the web driver into a web driver class bytecode; wherein modifying the test script comprises intercepting class loaders configured to load the web driver class bytecodes; decompiling the bytecode; replacing recipient of testing commands from a local test server with the remote test server as the recipient; recompiling the bytecode; and returning the recompiled bytecode to the class loaders.

Example 7: The method of some or all of Examples 1-6, wherein the testing commands comprise testing commands having a private server as recipient, wherein modifying the test script comprises generating remote testing commands from the test commands, the remote testing commands having the private server as the recipient, instead of the remote test server as the recipient, wherein the method further comprises: launching a router app; appending a shutdown hook to the remote testing commands; executing the remote testing commands, wherein the execution comprises the remote device accessing the private server through the router app; monitoring end of life cycle of the execution; and terminating the router app when the end-of-life cycle of the execution is detected.

Example 8: The method of some or all of Examples 1-7, wherein a software development kit performs the method steps, reducing or eliminating a need for code modifications from a user of the remote device testing system.

Example 9: A non-transitory computer storage that stores executable program instructions that, when executed by one or more computing devices, configure the one or more computing devices to perform operations comprising: receiving a parameter indicating a selection of remote testing of the test script, the test script comprising testing commands; modifying the test script comprising generating remote testing commands from the test commands, the remote testing commands comprising the testing commands having a remote test server as the recipient; receiving a selection of a type of remote device and operating system, the selection indicated in a configuration file of the test script; receiving an assignment of a remote device matching the selection of the remote device and the operating system indicated in the configuration file; transmitting the remote testing commands to the assigned remote device; and executing the remote testing commands on the assigned remote device.

Example 10: The non-transitory computer storage of Example 9, wherein modifying the test script occurs at runtime.

Example 11: The non-transitory computer storage of some or all of Examples 9 and 10, wherein the operations further comprise: receiving a parameter indicating a selection of local testing of the test script, wherein the test commands comprise local test commands, having a local test server as recipient; skipping the steps of modifying, receiving a selection, receiving an assignment, transmitting the remote testing commands and executing; and transmitting the local test commands to the local test server.

Example 12: The non-transitory computer storage of some or all of Examples 9-11, wherein the remote device is in a datacenter housing a plurality of devices of various types and operating systems.

Example 13: The non-transitory computer storage of some or all of Examples 9-12, wherein modifying the test script occurs at compile time by: decompiling a bytecode corresponding to the test script; replacing a recipient of the test commands to be the remote test server; and recompiling the bytecode.

Example 14: The non-transitory computer storage of some or all of Examples 9-13, wherein the operations further comprise: generating a web driver; compiling the web driver into a web driver class bytecode; wherein modifying the test script comprises intercepting class loaders configured to load the web driver class bytecodes; decompiling the bytecode; replacing recipient of testing commands from a local test server with the remote test server as the recipient; recompiling the bytecode; and returning the recompiled bytecode to the class loaders.

Example 15: The non-transitory computer storage of some or all of Examples 9-14, wherein the testing commands comprise testing commands having a private server as recipient, wherein modifying the test script comprises generating remote testing commands from the test commands, the remote testing commands having the private server as the recipient, instead of the remote test server as the recipient, wherein the operations further comprise: launching a router app; appending a shutdown hook to the remote testing commands; executing the remote testing commands, wherein the execution comprises the remote device accessing the private server through the router app; monitoring end of life cycle of the execution; and terminating the router app when the end-of-life cycle of the execution is detected.

Example 16: A system comprising a processor, the processor configured to perform operations comprising: receiving a parameter indicating a selection of remote testing of the test script, the test script comprising testing commands; modifying the test script comprising generating remote testing commands from the test commands, the remote testing commands comprising the testing commands having a remote test server as the recipient; receiving a selection of a type of remote device and operating system, the selection indicated in a configuration file of the test script; receiving an assignment of a remote device matching the selection of the remote device and the operating system indicated in the configuration file; transmitting the remote testing commands to the assigned remote device; and executing the remote testing commands on the assigned remote device.

Example 17: The system of Example 16, wherein the operations further comprise: receiving a parameter indicating a selection of local testing of the test script, wherein the test commands comprise local test commands, having a local test server as recipient; skipping the steps of modifying, receiving a selection, receiving an assignment, transmitting the remote testing commands and executing; and transmitting the local test commands to the local test server.

Example 18: The system of some or all of Examples 16 and 17, wherein modifying the test script occurs at compile time by decompiling a bytecode corresponding to the test script; replacing a recipient of the test commands to be the remote test server; and recompiling the bytecode.

Example 19: The system of some or all of Examples 16-18, wherein the operations further comprise: generating a web driver; compiling the web driver into a web driver class bytecode; wherein modifying the test script comprises intercepting class loaders configured to load the web driver class bytecodes; decompiling the bytecode; replacing recipient of testing commands from a local test server with the remote test server as the recipient; recompiling the bytecode; and returning the recompiled bytecode to the class loaders.

Example 20: The system of some or all of Examples 16-19, wherein the testing commands comprise testing commands having a private server as recipient, wherein modifying the test script comprises generating remote testing commands from the test commands, the remote testing commands having the private server as the recipient, instead of the remote test server as the recipient, wherein the operations further comprise: launching a router app; appending a shutdown hook to the remote testing commands; executing the remote testing commands, wherein the execution comprises the remote device accessing the private server through the router app; monitoring end of life cycle of the execution; and terminating the router app when the end-of-life cycle of the execution is detected.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to patent claims.

What is claimed is:

1. A method of porting a testing script into a remote device testing system comprising:
   receiving a first parameter indicating a selection of remote testing of the test script, the test script comprising testing commands;
   modifying the test script comprising generating remote testing commands from the testing commands, the remote testing commands comprising the testing commands, modified to have a remote test server as a recipient;
   receiving a selection of a type of remote device and operating system, the selection indicated in a configuration file of the test script;
   receiving an assignment of a remote device matching the selection of the remote device and the operating system indicated in the configuration file;
   transmitting the remote testing commands to the assigned remote device;
   executing the remote testing commands on the assigned remote device;
   receiving a second parameter indicating a selection of local testing of the test script, wherein the testing commands comprise local testing commands, addressed to a local test server as recipient;
   when receiving the second parameter, skipping the steps of modifying the test script, receiving a selection of a type of remote device and operating system, receiving an assignment, transmitting the remote testing commands and executing the remote testing commands; and
   transmitting the local testing commands to the local test server.

2. The method of claim 1, wherein modifying the test script occurs at runtime.

3. The method of claim 1, wherein the remote device is in a datacenter housing a plurality of devices of various types and operating systems.

4. The method of claim 1, wherein modifying the test script occurs at compile time by:
   decompiling a bytecode corresponding to the test script;
   replacing recipient of the testing commands to be the remote test server; and
   recompiling the bytecode.

5. The method of claim 1 further comprising:
   generating a web driver;
   compiling the web driver into a web driver class bytecode; wherein modifying the test script comprises intercepting class loaders configured to load the web driver class bytecodes;
   decompiling the bytecode;
   replacing recipient of testing commands from a local test server with the remote test server as the recipient;
   recompiling the bytecode; and
   returning the recompiled bytecode to the class loaders.

6. The method of claim 1, wherein the testing commands comprise testing commands having a private server as recipient, wherein modifying the test script comprises generating remote testing commands from the testing commands, the remote testing commands having the private server as recipient, instead of the remote test server as recipient, wherein the method further comprises:
   launching a router app;
   appending a shutdown hook to the remote testing commands;
   executing the remote testing commands, wherein the execution comprises the remote device accessing the private server through the router app;
   monitoring end of life cycle of the execution; and
   terminating the router app when the end-of-life cycle of the execution is detected.

7. The method of claim 1, wherein a software development kit performs the method steps, reducing or eliminating a need for code modifications from a user of the remote device testing system.

8. A non-transitory computer storage that stores executable program instructions that, when executed by one or more computing devices, configure the one or more computing devices to perform operations comprising:
   receiving a first parameter indicating a selection of remote testing of the test script, the test script comprising testing commands;
   modifying the test script comprising generating remote testing commands from the testing commands, the remote testing commands comprising the testing commands modified to have a remote test server as a recipient;
   receiving a selection of a type of remote device and operating system, the selection indicated in a configuration file of the test script;

receiving an assignment of a remote device matching the selection of the remote device and the operating system indicated in the configuration file;

transmitting the remote testing commands to the assigned remote device; executing the remote testing commands on the assigned remote device;

receiving a second parameter indicating a selection of local testing of the test script, wherein the testing commands comprise local testing commands, addressed to a local test server as recipient;

when receiving the second parameter, skipping the steps of modifying the test script, receiving a selection of a type of remote device and operating system, receiving an assignment, transmitting the remote testing commands and executing the remote testing commands; and transmitting the local testing commands to the local test server.

9. The non-transitory computer storage of claim 8, wherein modifying the test script occurs at runtime.

10. The non-transitory computer storage of claim 8, wherein the remote device is in a datacenter housing a plurality of devices of various types and operating systems.

11. The non-transitory computer storage of claim 8, wherein modifying the test script occurs at compile time by:
  decompiling a bytecode corresponding to the test script;
  replacing recipient of the testing commands to be the remote test server; and
  recompiling the bytecode.

12. The non-transitory computer storage of claim 8, wherein the operations further comprise:
  generating a web driver;
  compiling the web driver into a web driver class bytecode; wherein modifying the test script comprises intercepting class loaders configured to load the web driver class bytecodes;
  decompiling the bytecode;
  replacing recipient of testing commands from a local test server with the remote test server as the recipient;
  recompiling the bytecode; and
  returning the recompiled bytecode to the class loaders.

13. The non-transitory computer storage of claim 8, wherein the testing commands comprise testing commands having a private server as recipient, wherein modifying the test script comprises generating remote testing commands from the testing commands, the remote testing commands having the private server as recipient, instead of the remote test server as recipient, wherein the operations further comprise:
  launching a router app;
  appending a shutdown hook to the remote testing commands;
  executing the remote testing commands, wherein the execution comprises the remote device accessing the private server through the router app;
  monitoring end of life cycle of the execution; and
  terminating the router app when the end-of-life cycle of the execution is detected.

14. A system comprising a processor, the processor configured to perform operations comprising:
  receiving a first parameter indicating a selection of remote testing of the test script, the test script comprising testing commands;
  modifying the test script comprising generating remote testing commands from the testing commands, the remote testing commands comprising the testing commands, modified to have a remote test server as a recipient;
  receiving a selection of a type of remote device and operating system, the selection indicated in a configuration file of the test script;
  receiving an assignment of a remote device matching the selection of the remote device and the operating system indicated in the configuration file;
  transmitting the remote testing commands to the assigned remote device;
  executing the remote testing commands on the assigned remote device;
  receiving a second parameter indicating a selection of local testing of the test script, wherein the testing commands comprise local testing commands, addressed to a local test server as recipient;
  when receiving the second parameter, skipping the steps of modifying the test script, receiving a selection of a type of remote device and operating system, receiving an assignment, transmitting the remote testing commands and executing the remote testing commands; and
  transmitting the local testing commands to the local test server.

15. The system of claim 14, wherein modifying the test script occurs at compile time by:
  decompiling a bytecode corresponding to the test script;
  replacing a recipient of the test commands to be the remote test server; and
  recompiling the bytecode.

16. The system of claim 14, wherein the operations further comprise:
  generating a web driver;
  compiling the web driver into a web driver class bytecode; wherein modifying the test script comprises intercepting class loaders configured to load the web driver class bytecodes;
  decompiling the bytecode;
  replacing recipient of testing commands from a local test server with the remote test server as the recipient;
  recompiling the bytecode; and
  returning the recompiled bytecode to the class loaders.

17. The system of claim 14, wherein the testing commands comprise testing commands having a private server as recipient, wherein modifying the test script comprises generating remote testing commands from the testing commands, the remote testing commands having the private server as recipient, instead of the remote test server as recipient, wherein the operations further comprise:
  launching a router app;
  appending a shutdown hook to the remote testing commands;
  executing the remote testing commands, wherein the execution comprises the remote device accessing the private server through the router app;
  monitoring end of life cycle of the execution; and
  terminating the router app when the end-of-life cycle of the execution is detected.

18. The non-transitory computer storage of claim 8, wherein a software development kit performs the operations, reducing or eliminating a need for code modifications from a user of the remote device testing system.

19. The system of claim 14, wherein modifying the test script occurs at runtime.

20. The system of claim 14, wherein a software development kit performs the operations, reducing or eliminating a need for code modifications from a user of the remote device testing system.

\* \* \* \* \*